(12) United States Patent
Koster et al.

(10) Patent No.: US 7,444,473 B1
(45) Date of Patent: Oct. 28, 2008

(54) SPECULATIVE MEMORY ACCESSES IN A PROXIMITY COMMUNICATION-BASED OFF-CHIP CACHE MEMORY ARCHITECTURE

(75) Inventors: Michael J. Koster, Fremont, CA (US); Brian W. O'Krafka, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 265 days.

(21) Appl. No.: 11/155,374

(22) Filed: Jun. 17, 2005

(51) Int. Cl.
*G06F 12/00* (2006.01)

(52) U.S. Cl. .................................. 711/119

(58) Field of Classification Search ............. 711/119
See application file for complete search history.

(56) References Cited

U.S. PATENT DOCUMENTS

| | | | |
|---|---|---|---|
| 5,276,851 A | 1/1994 | Thacker et al. | |
| 5,502,828 A | 3/1996 | Shah | |
| 6,226,722 B1 * | 5/2001 | Shippy et al. | 711/168 |
| 6,247,107 B1 * | 6/2001 | Christie | 711/216 |
| 6,310,400 B1 * | 10/2001 | Doyle et al. | 257/777 |
| 6,314,491 B1 | 11/2001 | Freerksen et al. | |
| 6,651,139 B1 * | 11/2003 | Ozeki et al. | 711/118 |
| 6,892,290 B2 | 5/2005 | Van Doren | |
| 6,903,737 B2 | 6/2005 | Knittel | |
| 2002/0118206 A1 | 8/2002 | Knittel | |
| 2003/0154348 A1 * | 8/2003 | Keltcher et al. | 711/133 |
| 2004/0059875 A1 * | 3/2004 | Garg et al. | 711/141 |

OTHER PUBLICATIONS

Drost, et al.; "Proximity Communication"; IEEE 2003 Custom Integrated Circuits Conference, 0-7803-7842-3/03, pp. 469-472.

* cited by examiner

*Primary Examiner*—Matt Kim
*Assistant Examiner*—Ryan Dare
(74) *Attorney, Agent, or Firm*—Osha • Liang LLP

(57) ABSTRACT

A proximity interconnect module includes a plurality of processors operatively connected to a plurality of off-chip cache memories by proximity communication. Due to the high bandwidth capability of proximity interconnect, when an off-chip cache memory is searched for requested data, either the requested data is at the same time searched for in on-chip cache memories of the proximity interconnect module or the requested data is at the same time retrieved from main memory. This reduces latency by reducing serial operations.

18 Claims, 9 Drawing Sheets

SPECULATIVE MEMORY ACCESSES IN A PROXIMITY COMMUNICATION-BASED OFF-CHIP CACHE MEMORY ARCHITECTURE

CROSS-REFERENCE TO RELATED APPLICATIONS

The present application contains subject matter that may be related to the subject matter in the following U.S. applications filed on Jun. 17, 2005 and assigned to the assignee of the present application: "Cache Preloading in a Proximity Communication-Based Off-Chip Cache Architecture" Ser. No. 11/155,103; "Proximity Communication-Based Off-Chip Cache Memory Architectures" Ser. No. 11/155,375; and "Cache Protocol Enhancements in a Proximity Communication-Based Off-Chip Cache Memory Architecture" Ser. No. 11/156,332.

BACKGROUND

As shown in FIG. 1, a computer system 10 includes at least a processor 12 and a main memory 14. The processor 12 has a central processing unit (CPU) 13 that is used to perform most, if not all, of the data processing and computing operations of the computer system 10. Data needed by or generated from the processor 12 may be stored in the main memory 14. However, because the speed of the processor 12 is typically significantly faster than that of the main memory 14, memory of smaller size and faster speed (referred to and known as "cache" memory) is often implemented to allow the processor 12 to access frequently and/or recently requested data faster than it would otherwise take to obtain such data from the main memory 14.

Still referring to FIG. 1, the processor 12 may also have an "on-chip" (i.e., on the same semiconductor die as the processor 12) cache memory 16 and an "off-chip" (i.e., not on the same semiconductor die as the processor 12) cache memory 18. When the processor 12 requests data, a cache controller (not shown) causes the "on-chip" cache memory 16 to be searched for the requested data. If the search in the "on-chip" cache memory 16 does not result in a "hit" (i.e., a cache "miss" occurs), the "off-chip" cache memory 18 is searched for the requested data. If the requested data is not found in the "off-chip" cache memory 18, the requested data is retrieved from the relatively slow main memory 14. In the case where data is retrieved from the main memory 14, either or both of the "on-chip" cache memory 16 and the "off-chip" cache memory 18 may be updated with that retrieved data.

Those skilled in the art will recognize that a processor may have any number of cache memory levels, which are typically referred to by number in order of decreasing proximity to the processor. Further, those skilled in the art will recognize that any number of cache memories may be "on-chip" and any number of cache memories may be "off-chip."

SUMMARY

According to one aspect of one or more embodiments of the present invention, a system comprises: a processor having an on-chip cache memory; and an off-chip cache memory operatively connected to the processor by proximity communication, where, in response to a cache miss for requested data in the on-chip cache memory, the system is configured to search for the requested data in the off-chip cache memory in parallel with a search for the requested data in one of a main memory and at least one other on-chip cache memory.

According to another aspect of one or more embodiments of the present invention, a method of performing computer system operations comprises: searching for requested data in an on-chip cache memory of a processor; and if the requested data is not found in the on-chip cache memory, searching for the requested data in an off-chip cache memory in parallel with one of searching for the requested data in another on-chip cache memory and retrieving the requested data from a main memory, where the processor and the off-chip cache memory are operatively connected by proximity communication.

According to another aspect of one or more embodiments of the present invention, a system comprises: a proximity interconnect module; a plurality of processors disposed on the proximity interconnect module, the plurality of processors each having an on-chip cache memory; a plurality of off-chip cache memories disposed on the proximity interconnect module and operatively connected to the plurality of processors by proximity communication, where, in response to a cache miss for requested data in one of the on-chip cache memories, the system is configured to search for the requested data in one of the plurality of off-chip cache memories in parallel with at least one of searching for the requested data in another one of the on-chip cache memories and retrieving the requested data from a main memory.

Other aspects and advantages of the invention will be apparent from the following description and the appended claims.

DETAILED DESCRIPTION

Figure 1:
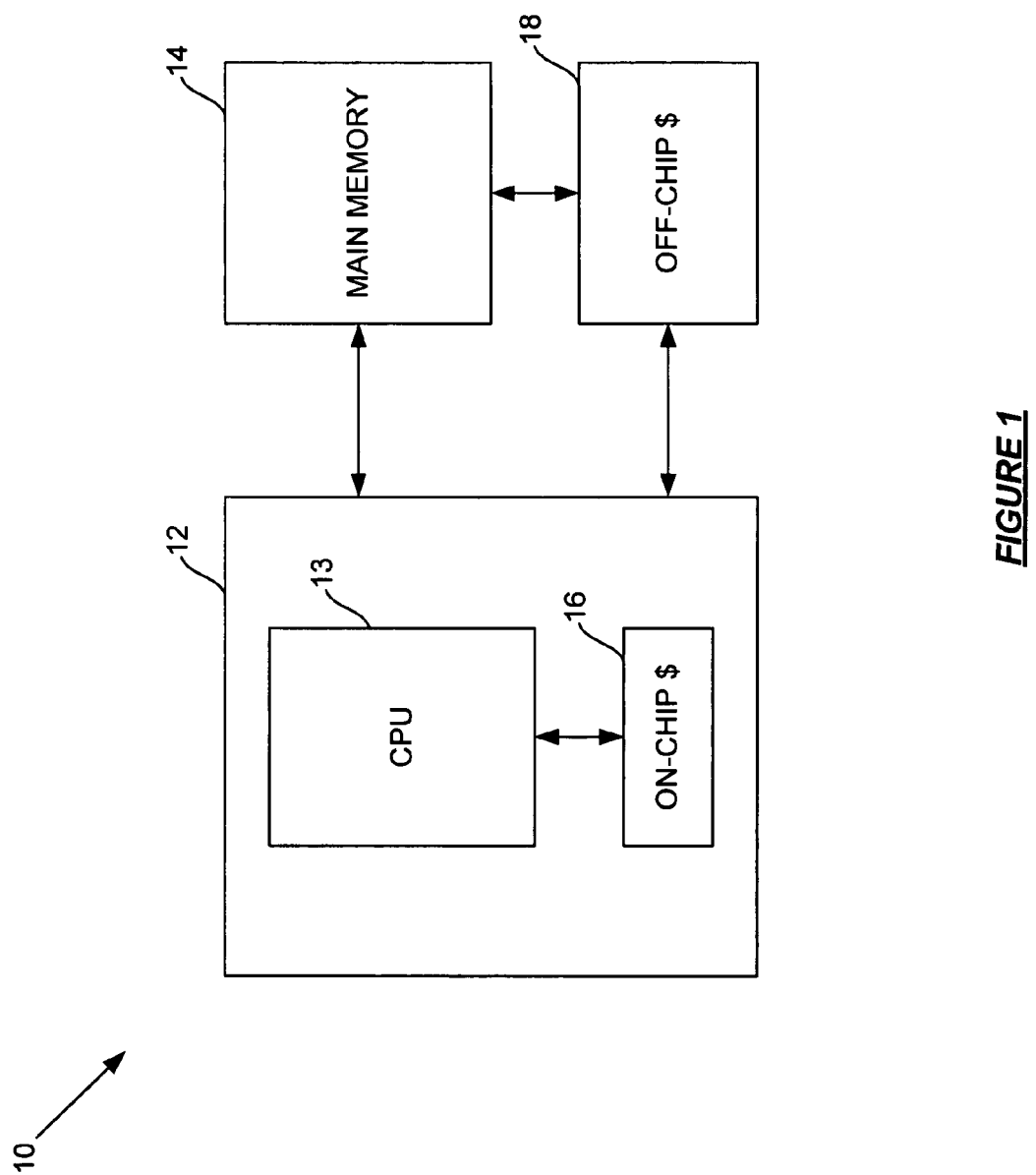
FIG. 1 shows a portion of a computer system.
Figure 2:
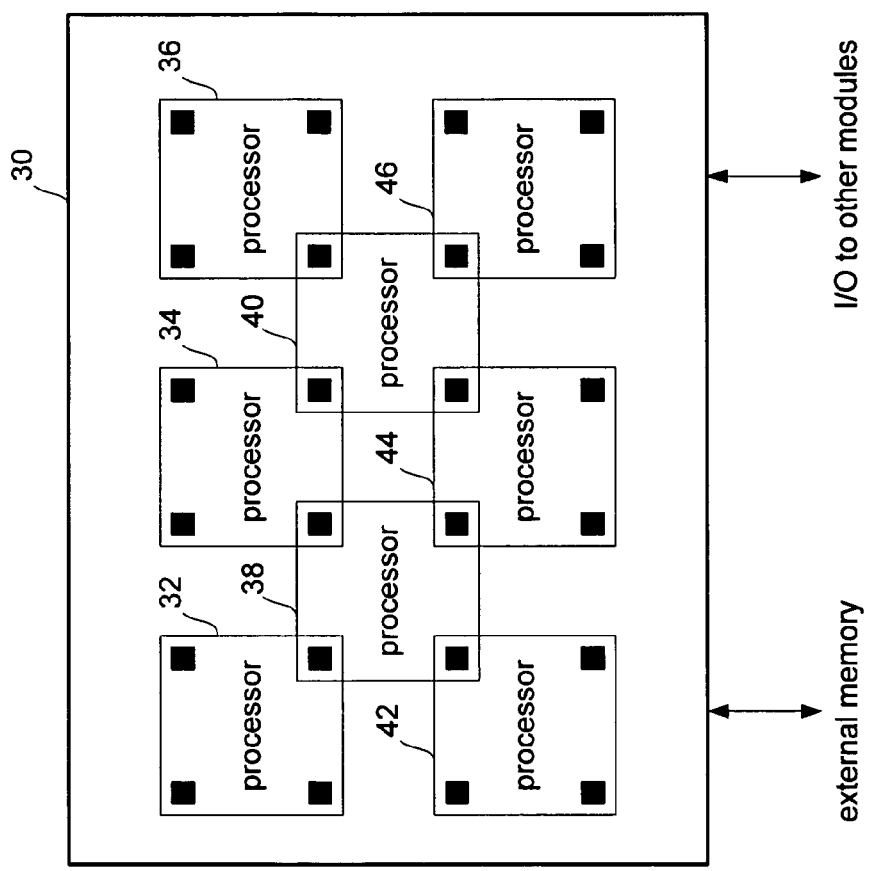
FIG. 2 shows a proximity interconnect module.

While a computer system such as that shown in FIG. 1 may be formed of a single processor, other computer systems may be formed of a plurality of computing modules, each having a plurality of processors. For example, as shown in FIG. 2, a computing module 30 may have processors 32, 34, 36, 38, 40, 42, 44, 46 and may be connected to an external main memory 48 and other computing modules (not shown). The processors 32, 34, 36, 38, 40, 42, 44, 46 are operatively connected to one another by a technique known and referred to as "proximity communication" (regions for proximity communication indicated by solid boxes shown at the corners of the processors 32, 34, 36, 38, 40, 42, 44, 46). A computing module having a proximity interconnect "switching fabric" may be referred to as a "proximity interconnect" module. In other words, a proximity interconnect module is a substrate upon which proximity communication is implemented for a collection of integrated circuits disposed on the substrate.

Proximity communication (also referred to and known as "proximity I/O communication") involves wireless data communication between closely-positioned integrated circuits. Instead of depending on relatively low-bandwidth interconnect (e.g., wires) for communicating data between integrated circuits, a proximity communication-enabled integrated circuit has embedded transmitting and receiving circuits that are "capacitively coupled" to respective receiving and transmitting circuits in another proximity communication-enabled integrated circuit. When capacitively coupled, a voltage change on a transmitting circuit induces a voltage change on a corresponding receiving circuit of the facing integrated circuit. This makes it possible to transmit signals directly between the integrated circuits without having to route the signal through intervening signal lines within, for example, a printed circuit board (PCB) or a ceramic multi-chip module (MCM). Further, those skilled in the art will note that proximity communication allows for higher bandwidth data communication than is typically possible with conventional interconnect (e.g., wires or PCB traces).

Figure 3A:
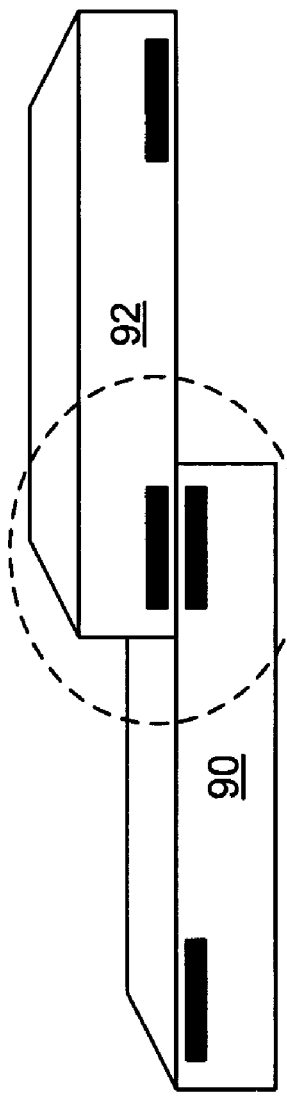
FIGS. 3A and 3B show integrated circuits configured for proximity communication.
Figure 3B:
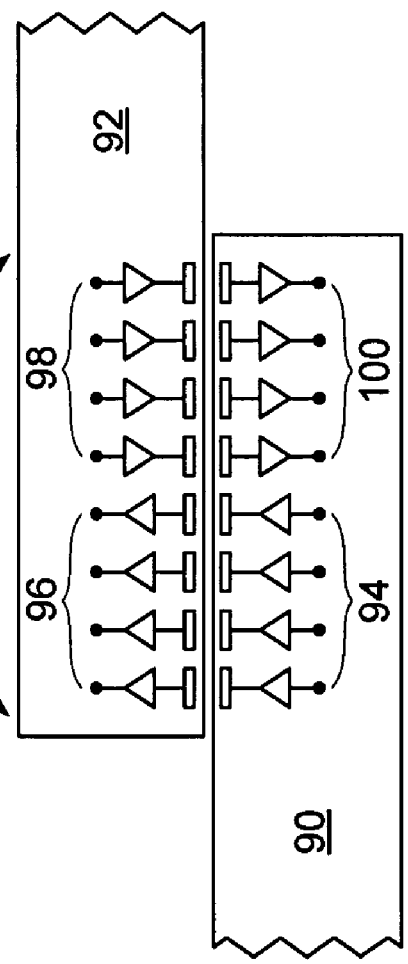

FIGS. 3A and 3B show integrated circuits configured for proximity communication. In FIGS. 3A and 3B, a first integrated circuit 90 is positioned for proximity communication with a second integrated circuit 92. Using, for example, capacitive coupling as described above, data is capable of being transferred (i) from transmitting circuits 94 of the first integrated circuit 90 to receiving circuits 96 of the second integrated circuit 92 and (ii) from transmitting circuits 98 of the second integrated circuit 92 to receiving circuits 100 of the first integrated circuit 90.

While the processors 32, 34, 36, 38, 40, 42, 44, 46 shown in FIG. 2 share main memory 48, in one or more embodiments of the present invention, off-chip cache memories are interspersed within a proximity communication fabric of a given proximity interconnect module. In other words, embodiments of the present invention generally relate to techniques and designs for connecting off-chip cache memories with processors in a proximity communication-based fabric. In essence, those skilled in the art will note that such interspersed off-chip cache memories may be viewed as a unitary off-chip cache memory.

Figure 4:
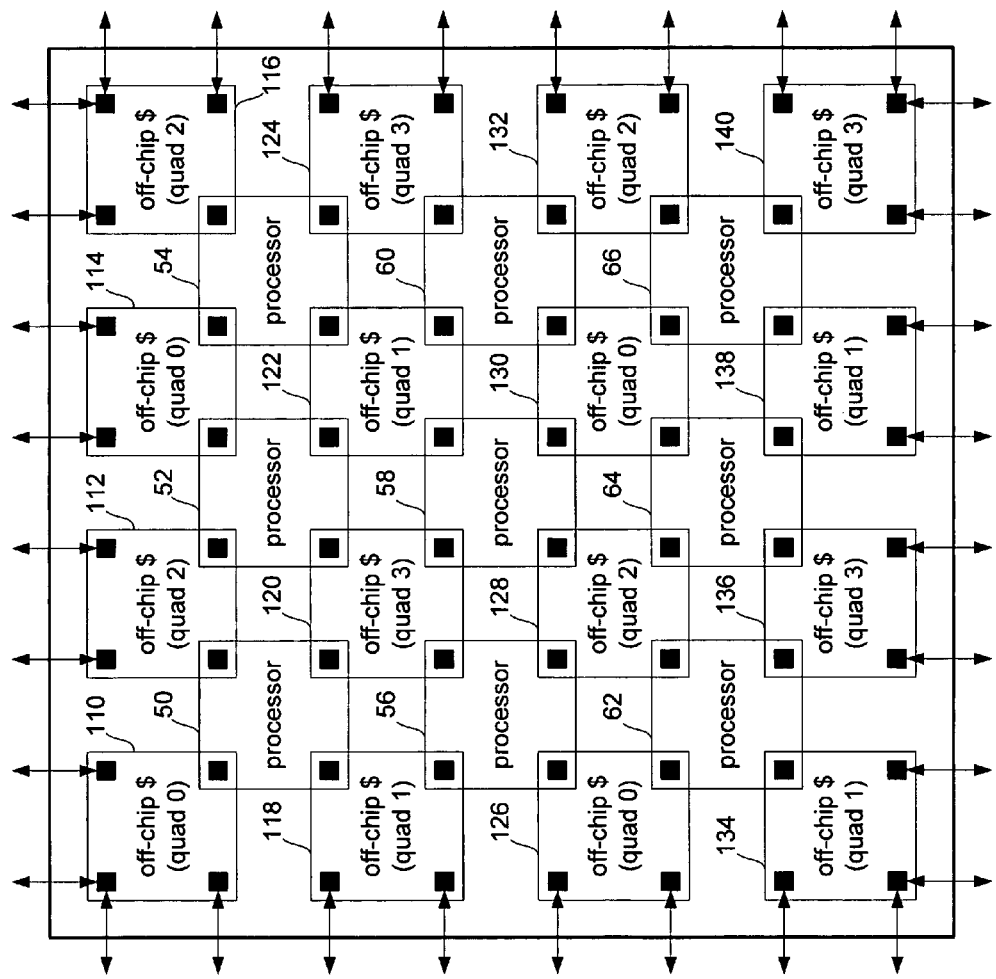
FIG. 4 shows a system architecture in accordance with an embodiment of the present invention.

FIG. 4 shows an exemplary system architecture in accordance with an embodiment of the present invention. In FIG. 4, processors 50, 52, 54, 56, 58, 60, 62, 64, 66 are interspersed with off-chip cache memories 110, 112, 114, 116, 118, 120, 122, 124, 126, 128, 130, 132, 134, 136, 138, 140 such that each processor 50, 52, 54, 56, 58, 60, 62, 64, 66 is connected by proximity communication to a different off-chip cache memory at each of its four corners. Similarly, each off-chip cache memory 110, 112, 114, 116, 118, 120, 122, 124, 126, 128, 130, 132, 134, 136, 138, 140 (except those at the edges of proximity interconnect module 49) is connected by proximity communication to a different processor at each of its four corners.

In one or more embodiments of the present invention, each off-chip cache memory 110, 112, 114, 116, 118, 120, 122, 124, 126, 128, 130, 132, 134, 136, 138, 140 caches data for all four processors to which it is attached. Physical address space may be divided into four quadrants, where a particular off-chip cache memory caches data from a particular one of the four quadrants. The quadrants may be assigned to the off-chip cache memories 110, 112, 114, 116, 118, 120, 122, 124, 126, 128, 130, 132, 134, 136, 138, 140 such that each processor is connected by proximity communication to an off-chip cache memory from each quadrant. In such a manner, because any given processor 50, 52, 54, 56, 58, 60, 62, 64, 66 is "locally" connected to four off-chip cache memories that each hold cached data belonging to a different quadrant of the physical address space, each processor 50, 52, 54, 56, 58, 60, 62, 64, 66 may be characterized as having its own complete off-chip cache memory.

Those skilled in the art will note that because there is more than one off-chip cache memory for each quadrant in FIG. 4, in one or more embodiments of the present invention, a cache coherence protocol to maintain consistency among the off-chip cache memories may be implemented and supported.

Those skilled in the art will note that at the edges of proximity interconnect module 49, off-module interconnect (e.g., cables, backplane buses) may be used to access off-module memory controllers, input/output ("I/O") interfaces, and module-to-module interconnect.

Those skilled in the art will note that in one or more embodiments of the present invention, each off-chip cache memory quadrant may have end-around connections so as to reduce a "hop" count incident with traversing the proximity interconnect module.

Those skilled in the art will note that in one or more other embodiments of the present invention, the physical address space may be divided into any number of portions. For example, the physical address space may be divided into two portions instead of four.

Figure 5:
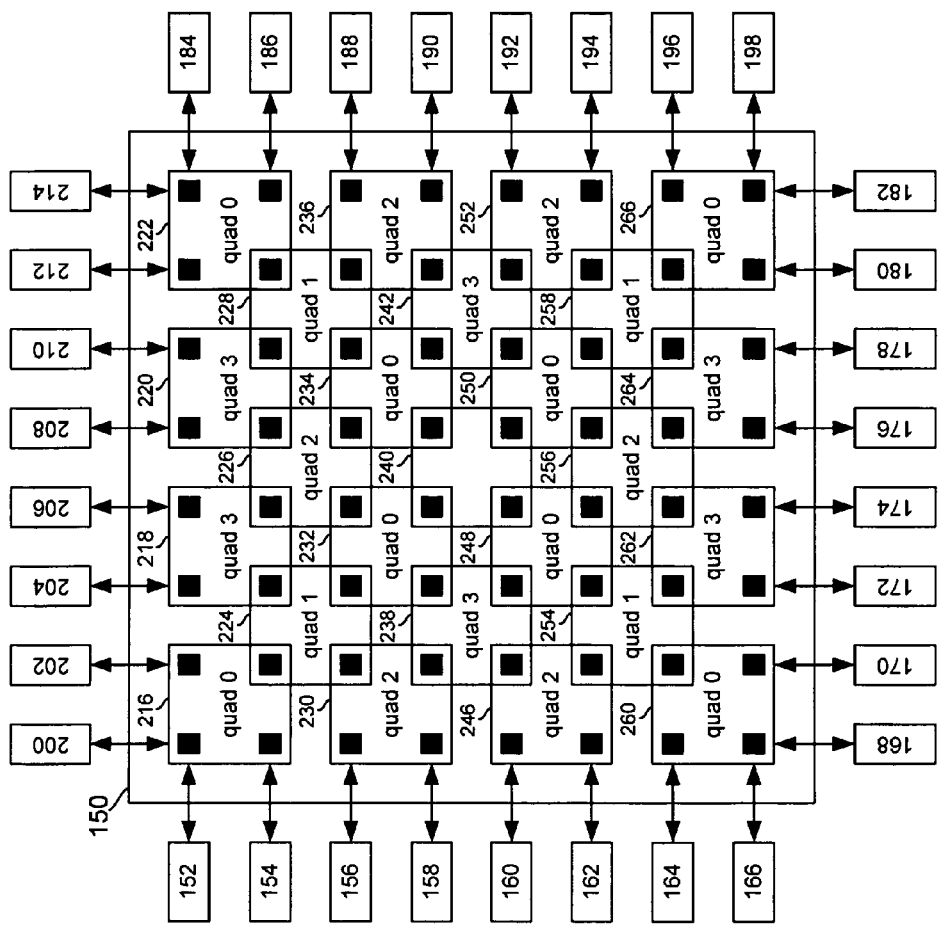
FIG. 5 shows a system architecture in accordance with an embodiment of the present invention.

FIG. 5 shows an exemplary system architecture in accordance with an embodiment of the present invention. In FIG. 5, processors 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214 are connected to a proximity interconnect module 150 having an array of off-chip cache memories 216, 218, 220, 222, 226, 228, 230, 232, 234, 236, 238, 240, 242, 244, 246, 248, 250, 252, 254, 256, 258, 260, 262, 264, 266.

Within the proximity interconnect module 150, an array of similar off-chip cache memories 216, 218, 220, 222, 226, 228, 230, 232, 234, 236, 238, 240, 242, 244, 246, 248, 250, 252, 254, 256, 258, 260, 262, 264, 266 is interconnected such that a small group of off-chip cache memories forms the off-chip cache memory for a given processor. The off-chip cache memories in these groups cache addresses in distinct, statically defined regions of the physical address space. As shown in FIG. 5, each off-chip cache memory 216, 218, 220, 222, 226, 228, 230, 232, 234, 236, 238, 240, 242, 244, 246, 248, 250, 252, 254, 256, 258, 260, 262, 264, 266 is designated as being one of four quadrants into which the physical address space of the total off-chip cache is divided. Further, those skilled in the art will note that in one or more embodiments of the present invention, a particular off-chip cache memory may be shared by a relatively small number of processors.

In one or more embodiments of the present invention, each off-chip cache memory 216, 218, 220, 222, 226, 228, 230, 232, 234, 236, 238, 240, 242, 244, 246, 248, 250, 252, 254, 256, 258, 260, 262, 264, 266 may have several switches that have connections to neighboring off-chip cache memories using proximity communication at the corners of its package. The switches implement a fabric that may carry cache-coherence traffic among multiple off-chip cache memories caching the same address region (e.g., off-chip cache memories of the same quadrant in FIG. 5). This fabric may also carry cache-coherence traffic between the off-chip cache memories 216, 218, 220, 222, 226, 228, 230, 232, 234, 236, 238, 240, 242, 244, 246, 248, 250, 252, 254, 256, 258, 260, 262, 264, 266 and the processors 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214.

Those skilled in the art will note that in one or more embodiments of the present invention, because proximity communication may be sufficiently dense enough to allow the architecture shown in FIG. 5 to support a low latency snooping-based cache-coherence protocol by confining high bandwidth snoop traffic to the proximity interconnect module 150. The off-chip cache memories 216, 218, 220, 222, 226, 228, 230, 232, 234, 236, 238, 240, 242, 244, 246, 248, 250, 252, 254, 256, 258, 260, 262, 264, 266 may filter out irrelevant snoop traffic that would otherwise saturate one or more of the processors 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214. Those skilled in the art will note that such filtering is particularly important when dealing with relatively narrow processor interfaces (e.g., HyperTransport).

Those skilled in the art will note that in one or more embodiments of the present invention, one or more of processors 152, 154, 156, 158, 160, 162, 164, 166, 168, 170, 172, 174, 176, 178, 180, 182, 184, 186, 188, 190, 192, 194, 196, 198, 200, 202, 204, 206, 208, 210, 212, 214 may be connected to its own memory (not shown).

Those skilled in the art will note that in one or more embodiments of the present invention, each off-chip cache memory quadrant may have end-around connections so as to reduce a "hop" count incident with traversing the proximity interconnect module.

Figure 6:
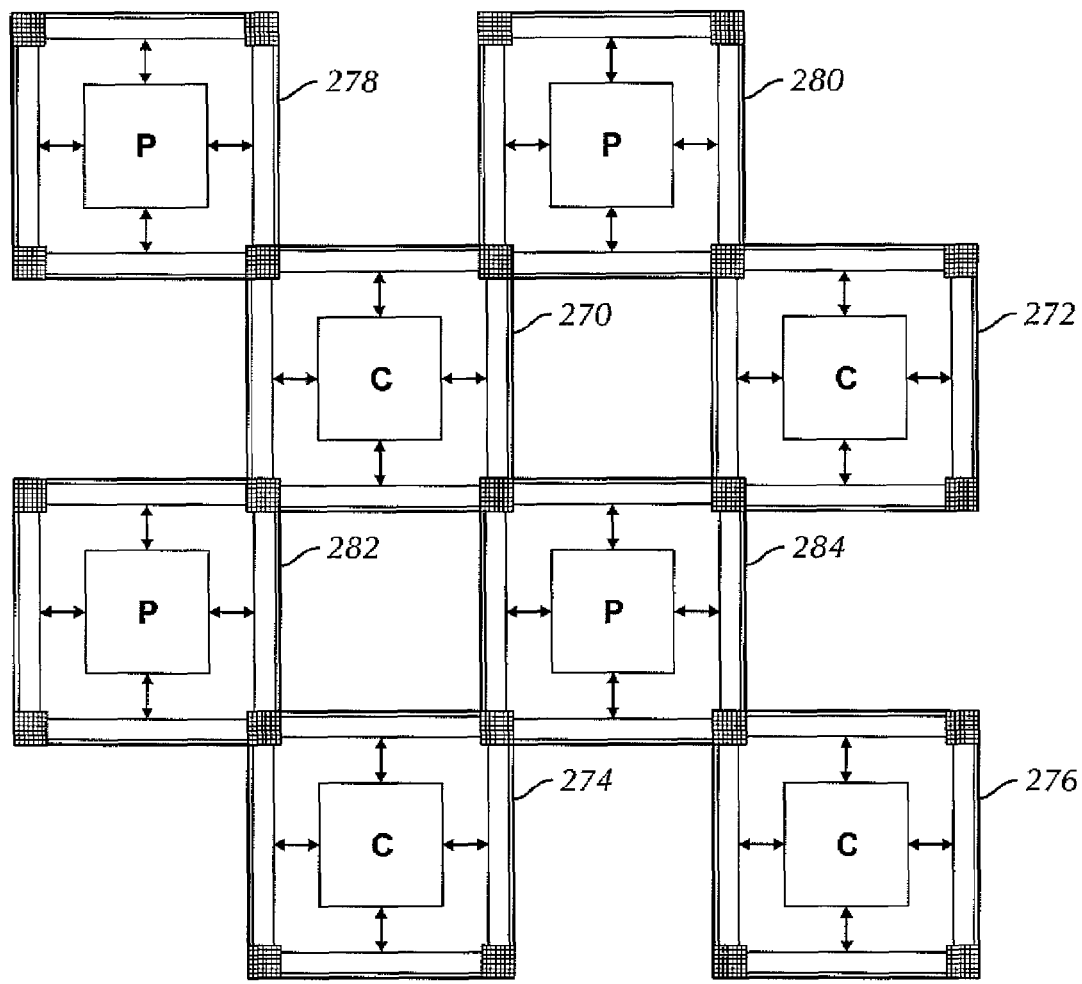
FIG. 6 shows a system architecture in accordance with an embodiment of the present invention.

FIG. 6 shows an exemplary system architecture in accordance with an embodiment of the present invention. In FIG. 6, off-chip cache memories 270, 272, 274, 276 having cache memory and controller logic are distributed along with processors 278, 280, 282, 284 in a proximity communication fabric such that any processor 278, 280, 282, 284 may retrieve data from any off-chip cache memory 270, 272, 274, 276.

Those skilled in the art will note that in one or more embodiments of the present invention, the off-chip cache memories 270, 272, 274, 276 may constitute a relatively large, address-interleaved, multi-bank, set-associative, shared off-chip cache memory.

Figure 7:
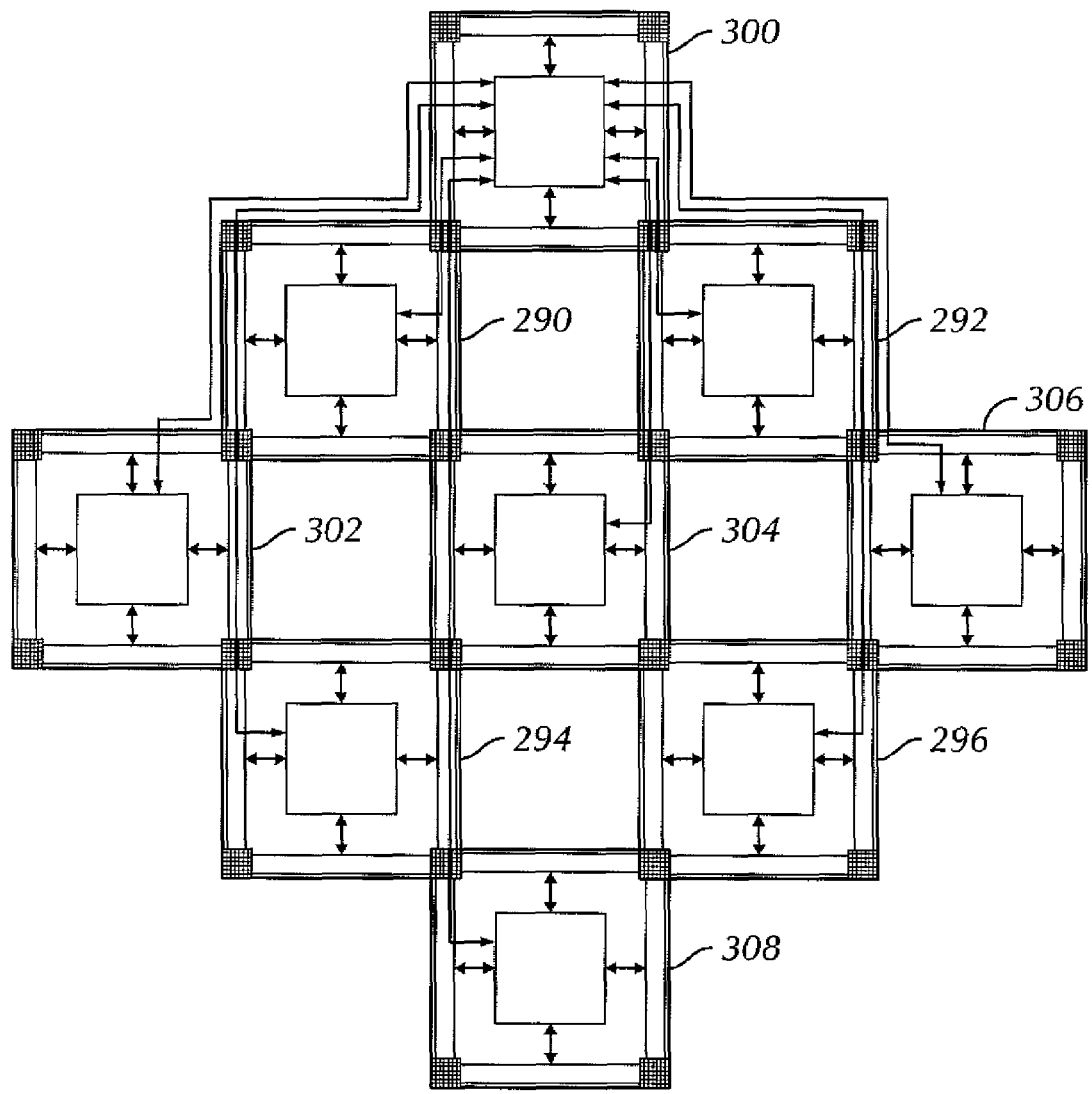
FIG. 7 shows a system architecture in accordance with an embodiment of the present invention.

FIG. 7 shows an exemplary system architecture in accordance with an embodiment of the present invention. In FIG. 7, off-chip cache memories 290, 292, 294, 296 having cache memory and controller logic are distributed along with processors 300, 302, 304, 306, 308 in a fully-connected crossbar switch fabric formed of proximity interconnect and hardwired paths (shown by arrows in FIG. 7) such that any processor may retrieve data from any off-chip cache memory. In one or more embodiments of the present invention, the processors 300, 302, 304, 306, 308 and the off-chip cache memories 290, 292, 294, 296 may be interconnected using dedicated point-to-point wiring connections enabled by the large number of available conductors in the proximity interconnect grid.

Those skilled in the art will note that in one or more embodiments of the present invention, full connection routing may require dedicated physical paths for each combination of endpoints.

As shown above in FIGS. 4-7, embodiments of the present invention relate to proximity communication-based off-chip cache memory architectures. Such architectures use the high bandwidth capability and low latency of proximity interconnect technology to create a large distributed off-chip cache memory that is shared among two or more processors on a proximity communication-based proximity interconnect module.

Embodiments of the present invention take advantage of the high bandwidth capability of a proximity communication-based proximity interconnect module by speculatively "snooping" on-chip cache memories on the proximity interconnect module in parallel with an off-chip cache memory look-up. In other words, in one or more embodiments of the present invention, when a requesting processor searches for requested data in an off-chip cache memory, the on-chip cache memories of the other processors on the proximity interconnect module are simultaneously searched for a valid copy of the requested data.

The benefits of such a technique can be seen by way of the following example. When an on-chip cache memory modifies a particular cache entry, that on-chip cache memory may evict a cache entry to an off-chip cache memory, in which case a particular off-chip cache memory cache entry may be invalidated. In a typical implementation, when this cache entry is next referenced, a cache miss in the off-chip cache memory will occur and the requested data will have to be obtained from the on-chip cache memory having the modified copy of the requested data. However, in one or more embodiments of the present invention, when a requesting processor searches for requested data in its off-chip cache memory, a multicast snoop operation is initiated to the on-chip cache memories of other processors, with the snoop response coming back from the modified on-chip cache memory in approximately the same amount of time it takes to discover the cache miss in the off-chip cache memory. Those skilled in the art will note that in such a manner, the delay otherwise needed to serially search the off-chip cache memory and then perform searches of the other on-chip cache memories is obviated as these steps are done in parallel in one or more embodiments of the present invention.

Further, those skilled in the art will note that in one or more embodiments of the present invention, searching the on-chip cache memories of other processors may involve searching the corresponding off-chip cache memories. For example, an off-chip cache memory may have a "shadow" directory that tracks the contents of its corresponding on-chip cache memory. When that on-chip cache memory is snooped, the "shadow" directory in its corresponding off-chip cache memory is first searched to determine whether the on-chip cache memory has a usable copy of the requested data. In that case, a copy of the requested data is transferred from that on-chip cache memory to the requesting processor.

Figure 8:
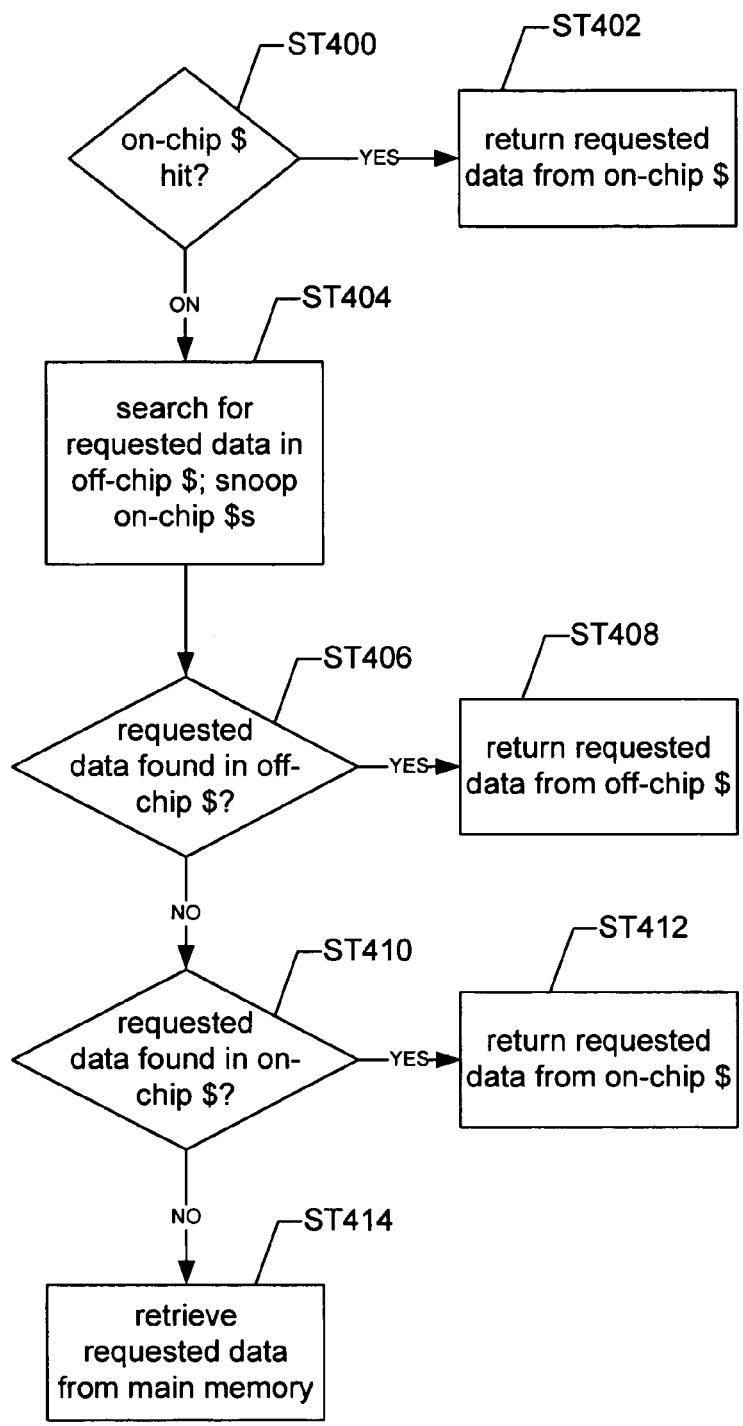
FIG. 8 shows a flow process in accordance with an embodiment of the present invention.

FIG. 8 shows an exemplary flow process in accordance with an embodiment of the present invention. If a cache hit occurs in an on-chip cache memory of a particular processor ST400, the requested data is returned from the on-chip cache memory ST402. Otherwise, if a cache miss occurs in the on-chip cache memory, (i) a corresponding off-chip cache memory is searched for the requested data and (2) the on-chip cache memories on the proximity interconnect module are snooped for the requested data ST404. If the requested data is found in the off-chip cache memory ST406, the requested data is returned from the off-chip cache memory ST408. If the requested data is found in one of the on-chip cache memories (via, for example, use of "shadow" directories in corresponding off-chip cache memories) ST410, the requested data is returned from that on-chip cache memory ST412. Otherwise, if the requested data is not found in either the off-chip cache memory or any of the on-chip cache memories, the requested data is retrieved from main memory ST414.

As described above, those skilled in the art will note that in one or more embodiments of the present invention, parallel searching is enabled by a large amount of inter-chip bandwidth made possible by proximity interconnect.

In one or more other embodiments of the present invention, when a miss occurs in an on-chip cache memory of a particular processor, the requested data may be searched for in a corresponding off-chip cache memory in parallel with retrieving the data from main memory. As described above, this type of behavior is possible due to the high bandwidth capability of the proximity interconnect used in any of the various proximity communication-based off-chip cache memory architectures described above with reference to FIGS. 4-7).

Figure 9:
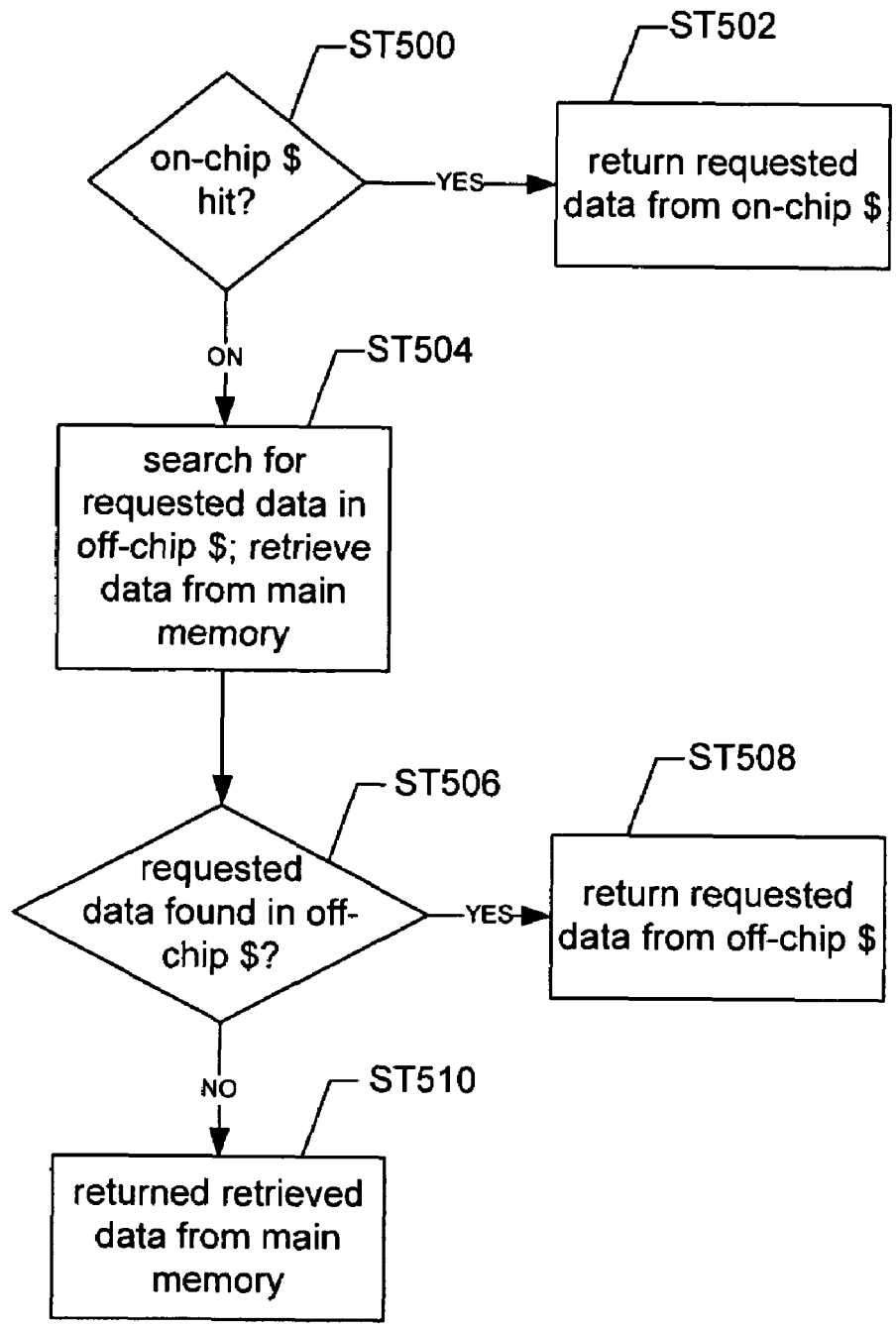
FIG. 9 shows a flow process in accordance with an embodiment of the present invention.

FIG. 9 shows an exemplary flow process in accordance with an embodiment of the present invention. If a cache hit occurs in an on-chip cache memory of a particular processor ST500, the requested data is returned from the on-chip cache memory ST502. Otherwise, if a cache miss occurs in the on-chip cache memory, (i) a corresponding off-chip cache memory is searched for the requested data and (2) the requested data is retrieved from the main memory ST504. If the requested data is found in the off-chip cache memory ST506, the requested data is returned from the off-chip cache memory ST508. Otherwise, the data already retrieved from the main memory is returned ST510. Those skilled in the art will note that by retrieving the requested data from main memory in parallel with the search for the requested data in the off-chip cache memory, overall memory latency is greatly reduced.

Advantages of the present invention may include one or more of the following. In one or more embodiments of the present invention, the use of proximity communication in a cache architecture allows for increased available bandwidth, thereby potentially leading to improved performance.

In one or more embodiments of the present invention, the use of proximity communication in a cache architecture allows for the implementation and use of off-chip cache memories, thereby reducing memory access times by reducing accesses to main memory.

In one or more embodiments of the present invention, the use of proximity communication in a cache architecture having off-chip cache memories allows for lower cache access times as opposed to that incurred with conventional interconnect.

In one or more embodiments of the present invention, because the use of proximity communication in a cache architecture allows for increased connectivity, more off-chip cache memories may be implemented, thereby improving cache performance.

In one or more embodiments of the present invention, because computer system throughput is in part dependent on and limited by the size, latency, and "sharedness" of an off-chip cache memory, embodiments of the present invention may enable substantial improvements in these aspects, thereby improving system performance.

In one or more embodiments of the present invention, within a proximity interconnect module, fast and wide off-chip cache memory interfaces may be integrated with wide fast connections provided by proximity interconnect at the four corners or along the four edges of each chip. Because the feasible off-chip signal count of proximity interconnect is markedly greater than that of conventional interconnect, a higher performance system may be possible.

In one or more embodiments of the present invention, because the high signal count of proximity interconnect allows for multiple wide, fast connections between off-chip cache memories on a proximity interconnect module, an off-chip cache memory may be constructed using several smaller chips of moderate cost rather than a single chip of high cost.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
    a first processor having a first on-chip cache memory;
    a second processor having a second on-chip cache memory, wherein the second processor is operatively connected to the first processor and a third processor by proximity communication, the third processor having a third on-chip cache memory, wherein the third processor is operatively connected to the first processor and the second processor by proximity communication; and
    a first off-chip cache memory operatively connected to the first processor and the second processor by proximity communication,
    wherein, in response to a cache miss for requested data in the first on-chip cache memory, the system is configured to search for the requested data in the first off-chip cache memory in parallel with searching for the requested data in the second on-chip cache memory and the third on-chip cache memory.

2. The system of claim 1, wherein, in response to finding the requested data in the first off-chip cache memory, the system is configured to return the requested data from the first off-chip cache memory.

3. The system of claim 1, wherein, in response to finding the requested data in the second on-chip cache memory and not finding the requested data in the first off-chip cache memory, the system is configured to return the requested data from the second on-chip cache memory.

4. The system of claim 1, wherein the proximity communication is performed using at least one of capacitive coupling, inductive coupling, magnetic coupling, and optical coupling.

5. The system of claim 1, wherein the requested data is searched for in the second on-chip cache memory and the third on-chip cache memory based on a snooping-based cache-coherence protocol.

6. The system of claim 1, further comprising:
    a second off-chip cache memory operatively connected to the second processor and the first off-chip cache memory by proximity communication; and
    a third off-chip cache memory operatively connected to the third processor and the first off-chip cache memory by proximity communication,
    wherein the system is further configured to search for the requested data in the second on-chip cache memory by searching the second off-chip cache memory, and to search for the requested data in the third on-chip cache memory by searching the third off-chip cache memory.

7. A method of performing computer system operations, comprising:
    searching for requested data in a first on-chip cache memory of a first processor; and
    when the requested data is not found in the first on-chip cache memory, searching for the requested data in a first off-chip cache memory in parallel with searching for the requested data in a second on-chip cache memory and a third on-chip cache memory of a third processor,
    wherein the first processor, the second processor, and the third processor are operatively connected by proximity communication, and the first off-chip cache memory are is operatively connected to the first processor and the second processor by proximity communication.

8. The method of claim 7, further comprising:
when the requested data is found in the second on-chip cache memory, returning the requested data from the second on-chip cache memory.

9. The method of claim 7, further comprising:
when the requested data is found in the first off-chip cache memory, returning the requested data from the first off-chip cache memory.

10. The method of claim 7, further comprising:
when the requested data is not found in the first off-chip cache memory and the second on-chip cache memory but is found in the third on-chip cache memory, returning the requested data from the third on-chip cache memory.

11. The method of claim 7, wherein the proximity communication is performed using at least one of capacitive coupling, inductive coupling, magnetic coupling, and optical coupling.

12. The method of claim 7, wherein searching for the requested data in the second on-chip cache memory and the third on-chip cache memory further comprises:
searching a second off-chip cache memory operatively connected to the second processor and the first off-chip cache memory by proximity communication; and
searching a third off-chip cache memory operatively connected to the third processor and the first off-chip cache memory by proximity communication.

13. A system, comprising:
a proximity interconnect module;
a plurality of processors disposed on the proximity interconnect module, the plurality of processors each having an on-chip cache memory; and
a plurality of off-chip cache memories disposed on the proximity interconnect module and operatively connected to the plurality of processors by proximity communication,
wherein, in response to a cache miss for requested data in a first on-chip cache memory of a first processor of the plurality of processors, the system is configured to search for the requested data in a first off-chip cache memory of the plurality of off-chip cache memories in parallel with searching for the requested data in all other on-chip cache memories of the on-chip cache memories.

14. The system of claim 13, wherein, in response to finding the requested data in the first off-chip cache memory, the system is configured to return the requested data from the first off-chip cache memory.

15. The system of claim 13, wherein, in response to not finding the requested data in the first off-chip cache memory and finding the requested data in a second on-chip cache memory of the on-chip cache memories, the system is configured to return the requested data from the second on-chip cache memory.

16. The system of claim 13, wherein the system is configured to search for the requested data in all other on-chip cache memories of the on-chip cache memories using a snooping-based cache-coherence protocol.

17. A system, comprising:
a proximity interconnect module;
a plurality of processors disposed on the proximity interconnect module, the plurality of processors each having an on-chip cache memory;
a plurality of off-chip cache memories disposed on the proximity interconnect module and operatively connected to the plurality of processors by proximity communication; and
a main memory operatively connected to the plurality of processors and the proximity interconnect module,
wherein, in response to a cache miss for requested data in one of the on-chip cache memories, the system is configured to search for the requested data in one off-chip cache memory of the plurality of off-chip cache memories in parallel with searching for the requested data in all of the other on-chip cache memories of the plurality of other processors in the system.

18. The system of claim 17, wherein, in response to not finding the requested data in the off-chip cache memory, the system is configured to retrieve the requested data from the main memory.

* * * * *